(12) United States Patent  
McDaniel et al.

(10) Patent No.: US 7,559,421 B1
(45) Date of Patent: Jul. 14, 2009

(54) MODULAR LINK CONVEYOR CHAIN WITH RETURN RUN SUPPORT ARRANGEMENT

(75) Inventors: Michael D. McDaniel, Glasgow, KY (US); Wendell S. Bell, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 238 days.

(21) Appl. No.: 11/256,439

(22) Filed: Oct. 21, 2005

Related U.S. Application Data

(60) Provisional application No. 60/621,995, filed on Oct. 25, 2004.

(51) Int. Cl.
*B65G 17/08* (2006.01)
*B65G 17/06* (2006.01)

(52) U.S. Cl. ............ 198/820; 198/832; 198/844.1; 198/845; 198/849; 198/851

(58) Field of Classification Search ............ 198/778, 198/820, 832, 844, 845, 851, 844.1, 846, 198/849
See application file for complete search history.

(56) References Cited

U.S. PATENT DOCUMENTS

| | | | |
|---|---|---|---|
| 3,669,247 A | 6/1972 | Pulver | |
| 3,985,224 A | 10/1976 | Harvey | |
| 4,077,510 A | 3/1978 | Muller | |
| 4,545,477 A | 10/1985 | Besch | |
| 4,742,907 A | 5/1988 | Palmaer | |
| 4,832,187 A | 5/1989 | Lapeyre | |
| 4,899,871 A * | 2/1990 | Olsson | 198/778 |
| 4,953,693 A * | 9/1990 | Draebel | 198/853 |
| 4,993,544 A | 2/1991 | Bailey et al. | |
| 5,000,312 A | 3/1991 | Damkjaer | |
| 5,031,757 A | 7/1991 | Draebel et al. | |
| 5,127,515 A | 7/1992 | Damkjaer | |
| 5,190,145 A | 3/1993 | Ledginham et al. | |
| 5,224,587 A | 7/1993 | Robertson | |
| 5,593,019 A | 1/1997 | Schlagel | |
| 5,782,340 A | 7/1998 | Dolan | |
| 6,227,356 B1 | 5/2001 | Van Zijderveld et al. | |
| 6,484,379 B2 * | 11/2002 | Palmaer | 29/401.1 |
| 6,708,818 B2 * | 3/2004 | Kato et al. | 198/853 |
| 7,090,070 B2 * | 8/2006 | Linder | 198/841 |

FOREIGN PATENT DOCUMENTS

| | | |
|---|---|---|
| EP | 0493349 | 7/1992 |
| GB | 2055731 | 3/1981 |

* cited by examiner

*Primary Examiner*—Gene Crawford
*Assistant Examiner*—Kavel P Singh
(74) *Attorney, Agent, or Firm*—King & Schickli, PLLC

(57) ABSTRACT

A conveyor system includes a chain with modular side and intermediate guide links. The guide links assist in supporting the chain along the return run in a suspended fashion intermediate of the outer sides without causing wear on the conveying surface. Related methods are also disclosed.

20 Claims, 9 Drawing Sheets

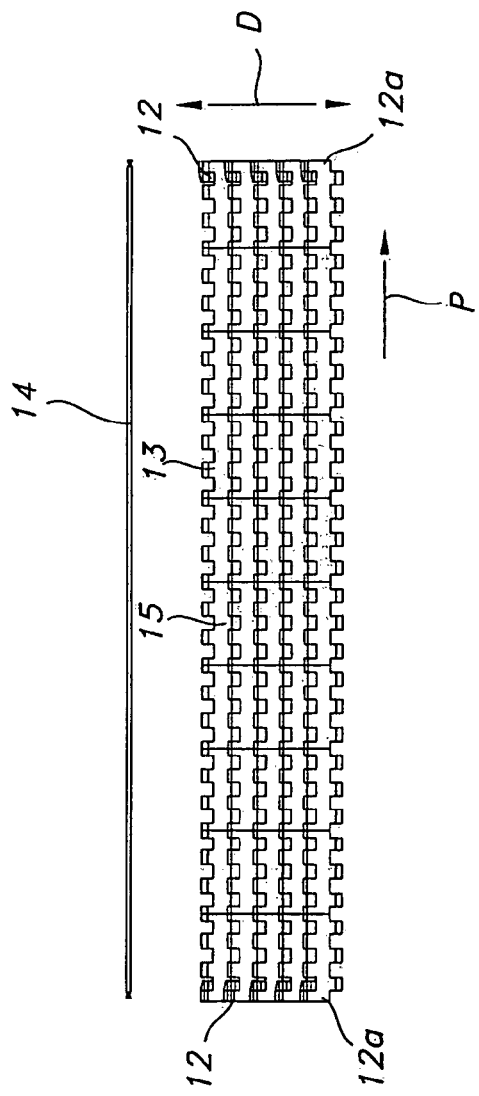
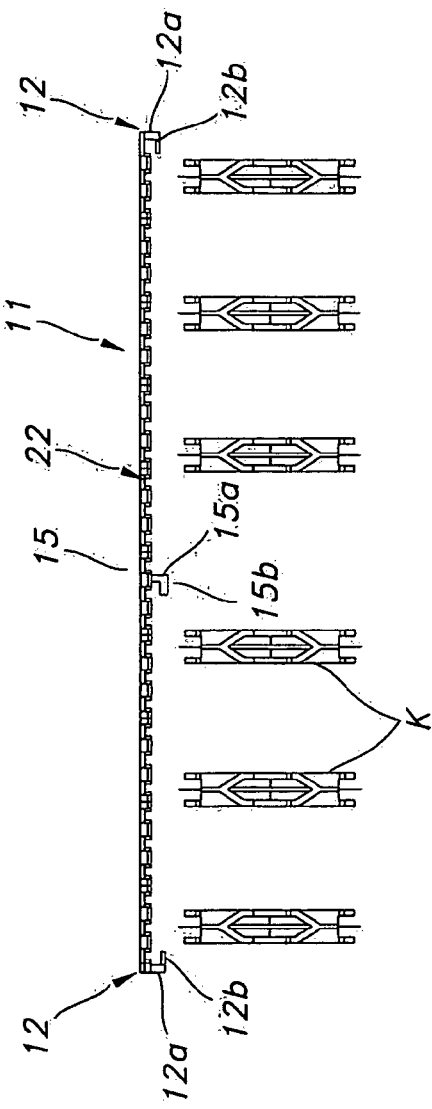

MODULAR LINK CONVEYOR CHAIN WITH RETURN RUN SUPPORT ARRANGEMENT

This application claims the benefit of U.S. Provisional Patent Application Ser. No. 60/621,995, filed Oct. 25, 2004, the disclosure of which is incorporated herein by reference.

TECHNICAL FIELD

This invention relates generally to the conveyor art and, more particularly, to any conveyor including a belt or chain susceptible to sagging along a return run or wear on the conveying surface as the result of engaging a support structure.

BACKGROUND OF THE INVENTION

The use of modular link conveyors in industry enjoys increasing popularity. Particularly for conveying food articles or consumer products, especially in packages or in semi-packaged form, the modular link conveyor represents the overwhelming choice of those in the industry looking for a long-lasting, low cost conveying solution. In the recent past, significant advances in the development of such have been made so as to provide more efficient handling of an even larger variety of food articles, packages and containers, as well as other types of articles and products.

One of the most popular types of modular link conveyor systems on the market today, if not the most popular, is manufactured and sold by the assignee of the present invention under THE DESIGNER SYSTEM and WHISPER-TRAX trademarks, and illustrated and claimed in prior U.S. Pat. No. 4,953,693, Sep. 4, 1990 and U.S. Pat. No. 5,031,757, issued Jul. 16, 1991 (the disclosures of which are fully incorporated herein by reference). Since the time of these early patents in the art, the significant advances have been fast in coming to provide an even more efficient operation and better handling and transporting of articles and products.

Despite eliminating the deleterious catenary approach prevalent in the prior art and the secure holding provided along the sides by the guide links, a problem sometimes arises with sagging of the conveyor chain in the vertical direction along the return run. This sagging is especially prevalent when a particular width of modular link chain is reached or exceeded. For example, in the case of a modular link chain with links styled similar to those shown in the '693 patent and with a four millimeter diameter stainless steel connector rod, the cutoff width is about twenty-five inches or more. Increasing the diameter of the connector rod is not an option without redesigning the corresponding link (which would then preclude retrofitting).

To prevent sagging of the chain intermediate of the sides, the solution practiced for many years is to support the chain externally along the return run of the endless conveying path. In the past, such support has been provided by structures such as curved rails spanning in the longitudinal direction (see, e.g., U.S. Pat. No. 5,190,145 to Ledginham et al.). These structures contact the conveying surface along the return run and thus provide the desired intermediate support.

The problems encountered with this arrangement are manifold. One is that, over time, the constant contact between the conveying surface and the external longitudinal rail along the return run tends to result in excessive wear. In particular, the longitudinal rail may over time create a groove or channel in the conveying surface of the belt or chain. Besides contributing to premature wear and potential failure, articles conveyed on the belt or chain can become unstable or caught on this groove or channel, either of which is deleterious for obvious reasons. Moreover, the groove or channel in some instances creates a deep crevasse that can be difficult to clean, and thus may serve as a breeding ground for bacteria or the like (a significant concern when food products or the like are being conveyed). While it is possible to rebuild the chain by removing the offending links, this represents a considerable undertaking in terms of expense and man hours.

Another problem is that this arrangement requires an uninterrupted path along the conveying surface of the chain for engaging the support. Thus, it cannot be used with chains having scoops, cleats, or other structures projecting from the conveying surface. A related problem is the requirement for external brackets for supporting the guide rail from the side frame, which can be awkward and in some cases may interfere with the smooth passage of the chain along the return run.

Accordingly, a need is identified for an improved arrangement for supporting a conveyor belt or chain along the return run of an endless conveyor. The arrangement would have particular utility in arrangements in which the belt or chain is particularly wide and thus susceptible to sagging intermediate of the side edges in the absence of external support. The usefulness would remain even in situations where a non-smooth conveying surface is provided.

SUMMARY OF THE INVENTION

In accordance with one aspect of the invention, a conveyor system for intended use in moving one or more articles in at least a conveying direction along an endless path having a forward run and a return run is disclosed. The system comprises a plurality of modular links including spaced outer side links and an intermediate guide link connected to form at least one row. The intermediate guide link includes a projection extending from opposite a conveying surface and carries at least one transversely extending tab. A rail extends in the conveying direction along the return run between the side links for engaging the transversely extending tab of the intermediate guide link to provide support for the links in a suspended fashion, prevent sagging, and reduce wear on the conveying surface.

In one embodiment, each side link includes a transversely extending tab for engaging at least a portion of a longitudinal rail mounted on opposite sides of the return run. Preferably, the intermediate link is of one-piece construction, but could also comprise a body for positioning within a recess formed at least partially in another link in the row. In such case, the body may include at least one opening for receiving a transverse connector passing through and interconnecting the links in the row, and preferably a first opening for receiving a first transverse connector associated with a first row of links and a second opening for receiving a second transverse connector associated with a second, adjacent row of links. The projection may extend adjacent one vertical face of the intermediate guide link, and at least one link may be positioned between each side link and the intermediate guide link in the row.

In accordance with another aspect of the invention, a conveyor system for intended use in moving one or more articles in at least a conveying direction along an endless path having a forward and a return run is provided. The system comprises a plurality of modular links forming rows. Each row includes at least three projections extending opposite a conveying surface, and each projection carries a transversely extending tab. Rails extending in the conveying direction along the return run engage the tabs and provide enhanced support for the row to prevent sagging and reduce wear on the conveying surface.

In one embodiment, each rail is carried by at least one transverse member supported by a side frame member of the conveyor system.

In accordance with a further aspect of the invention, a chain is provided for intended use in moving one or more articles in at least a conveying direction along an endless path having a forward and a return run. The chain comprises spaced outer side guide links, each including a first projection extending opposite a conveying surface along the outermost side of the side guide link. The chain further comprises an intermediate guide link positioned between and connected to the side guide links, the guide link having a second projection extending opposite the conveying surface and including a transversely extending tab.

In one embodiment, the side guide links are each of one-piece construction and the intermediate guide link comprises a body sized for positioning within a recess of a link forming the chain. The body preferably includes a first opening for receiving a transverse connector associated with and interconnecting a first row of links and a second transverse connector associated with and interconnecting a second, adjacent row of links.

In accordance with still a further aspect of the invention, a support arrangement intended for use with a modular conveyor chain having a return run along which at least three links in a transverse row include an upstanding projection opposite a conveying surface and carry a tab projecting in a direction transverse to the conveying direction is provided. The support arrangement comprises at least three transversely spaced rails extending in the conveying direction and positioned along the return run, each for engaging a surface of the chain opposite the conveying surface. As a result, the spaced rails support the chain in a suspended fashion without wearing the conveying surface. In one embodiment of the support arrangement, the projection and tab together create a recess and each rail is adapted for insertion in the recess.

In accordance with still another aspect of the invention, a method of forming a conveyor system including an endless chain moving in an endless path having a forward run and a return run is disclosed. The method comprises supporting the endless chain along the return run in a suspended fashion using at least three rails extending in the conveying direction and positioned opposite a conveying surface of the chain.

The method may further include the step of providing the endless chain with a row of at least three guide links, each having a projection extending opposite a conveying surface, the projection carrying a tab extending in a direction transverse to the conveying direction, wherein each tab engages one of the rails. The method may still further include the steps of nesting a guide link having a transverse projection in a recess formed in another link, and then passing a transverse connector through the nested link. Preferably, the supporting step is performed without contacting the conveying surface of the chain along the return run.

These and other aspects of the present invention will become readily apparent to those skilled in this art from the following description wherein there is shown a preferred embodiment simply by way of illustration of one of the modes best suited to carry out the invention. As it will be realized, the invention is capable of other different embodiments and it several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings:

FIGS. 8a and 8b are top plan and side schematic views of a conveyor chain incapable of side flexing but including an intermediate guide link for providing support along the return run in a suspended fashion;

Reference is now be made in detail to the preferred embodiments of the invention, examples of which are illustrated in the accompanying drawings.

DETAILED DESCRIPTION OF THE INVENTION

Figure 1:
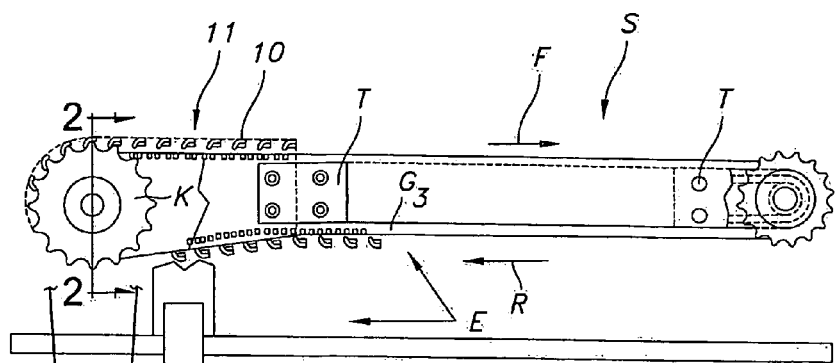
FIG. 1 is a side schematic view of one possible conveyor system for use in connection with the present invention.
Figure 2:
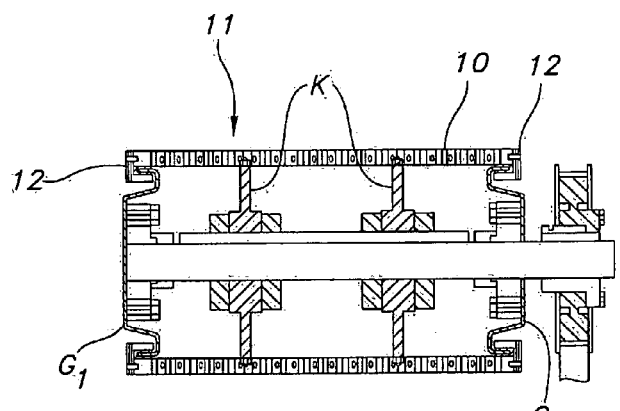
FIG. 2 is a cross-sectional view of the system of FIG. 1 taken along like 2-2.

Reference is now made to FIGS. 1 and 2, which depict an overall arrangement of a conveyor system S including a belt or chain 10. The chain 10 includes a conveying surface 11 for engaging and supporting one or more articles. In this particular embodiment, the chain 10 comprises or includes modular links including side guide links 12 and intermediate links 13 arranged in spaced apart rows (see FIG. 6 and note rows $R_1 \ldots R_N$), which thus partially create the conveying surface 11. Adjacent rows $R_1$, $R_2$ of links are interconnected by transverse connectors 14, which are also referred to in the vernacular as "cross rods."

With regard to the side links 12, and as perhaps best understood by viewing FIGS. 3 and 4a-4c, each may include an optional outer depending projection or arm 12a and an inwardly projecting or extending transverse tab 12b (thus creating different right handed or left handed side links, depending on the particular positioning). When both are present, the depending arm 12a and transverse tab 12b are designed to receive a conventional support structure, which may include spaced apart, longitudinally extending guide rails $G_1$ or $G_2$ as members of the conveyor support frame E (see FIGS. 4 and 5b). These guide rails $G_1$, $G_2$ support the chain 10 along both the forward run F and the return run R as it is bidirectionally driven in an endless path (such as by spaced sprockets K adapted for engaging the links along a transition from a forward run F to a return run R and gang-driven by an associated motor M).

Figure 5:
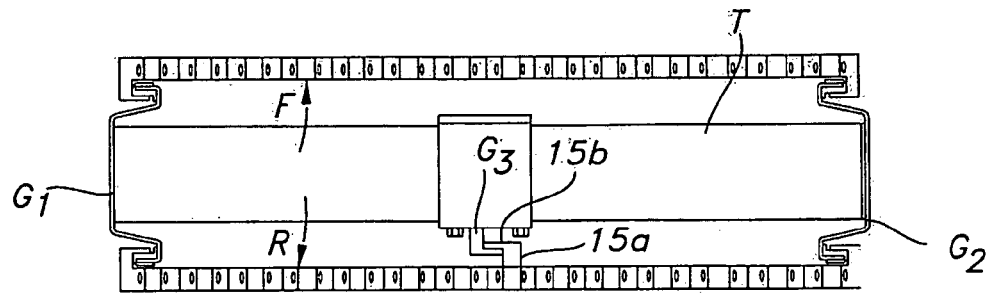
FIG. 5 is an end view of the support arrangement for the conveyor chain in the system of FIG. 1.

Each guide rail $G_1$ or $G_2$ preferably includes a wear strip W formed of a tribologically enhanced material to provide reduced friction contact with the links 12. The guide rails $G_1$ or $G_2$ may be C-shaped or sigma shaped, as shown in FIGS. 2 and 5, or instead may simply include one or more support sections of any desired shape with the associated wear strips W (including a one-piece arrangement) such that they project outwardly therefrom like a tongue or tenon and thus form a bearing surface for the chain 10 (and, in particular, the side guide links 12). Associated links of the sort mentioned are typically formed of complementary or matched materials, such as Nylon 6-6, Acetal, or other inexpensive, lightweight, and durable materials using well-known forming techniques (including possibly co-molding of different materials). Although performance of the system S may be improved as a result, matching of the materials forming the links and guide rails (wear strips) is not considered a requirement.

Preferably, pairs of side links 12 together with intermediate links 13 form rows spaced apart in the direction in which the chain 10 is typically driven (referred to as the longitudinal direction or the conveying direction (note action arrow D in the plan view of FIG. 6), since it corresponds to the main direction in which articles are conveyed by the chain 10 during normal operation, as opposed to the transverse or lateral direction P). To interconnect the pairs of links 12 forming a first (leading) row $R_1$, the transverse connector 14 in one embodiment takes the form of a stainless steel rod passing through aligned holes (see FIG. 6) formed in foot portions 13c of each intermediate link 13 (which may be more than two in cases where each link has plural laterally repeating sections), including the side link 12 (if present). During construction of the chain 10, the links 12, 13 of a second, adjacent (trailing) row $R_2$ are interdigitated with those of the first row $R_1$, with the connector 14 passing through a slot 12d elongated in the conveying direction D and formed in the apex 12e of each link 12, 13 in the second row.

Figure 10:
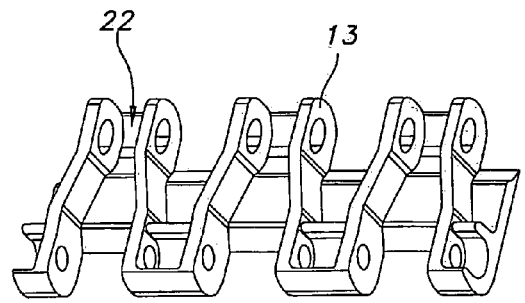
FIG. 10 is a perspective view showing the recessed underside of a link.
Figure 3:
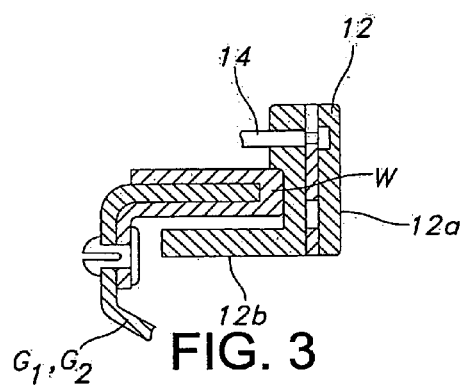
FIG. 3 is a partially cutaway, cross-sectional end view of a side link and guide rail forming part of the conveyor system of FIG. 1.

As should be appreciated by those of skill in the art, this specific structural arrangement (which is considered entirely optional) allows for the chain 10 to side-flex to negotiate curves or bends (see FIG. 6), as well as to compress or expand in the longitudinal direction, and thus eliminates the need for a catenary. If such enhanced functionality is not necessary for a particular application, the slots 12e could simply be replaced with plain holes for receiving the connector 14, which would this result in a non-side flexing, non-longitudinally compressible chain (see, e.g., FIGS. 10 and 11).

Figures 4A, 4B, 4C:
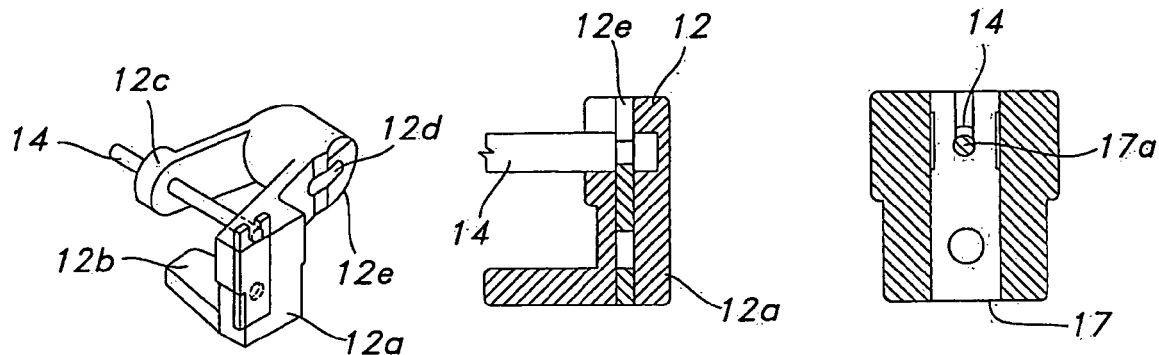
FIGS. 4a, 4b, and 4c are perspective and cross-sectional views of the side link of FIG. 3.

The connector 14 is retained in place by a locking element or tab 16 removably inserted in a receiver 12f or slot formed in each side link 12. As shown in FIG. 4c, the tab 17 may include a recess 17a for engaging a necked or recessed portion 14a of the connector 14. This pattern of assembly may be repeated among the interdigitated links 12, 13 as necessary to form a chain 10 having a particular length in the conveying direction. A full description of this type of chain or "belt" as it is sometimes called in the vernacular, is found in the commonly assigned '693 and '757 patents, the disclosures of which are fully incorporated herein by reference.

Figure 7:
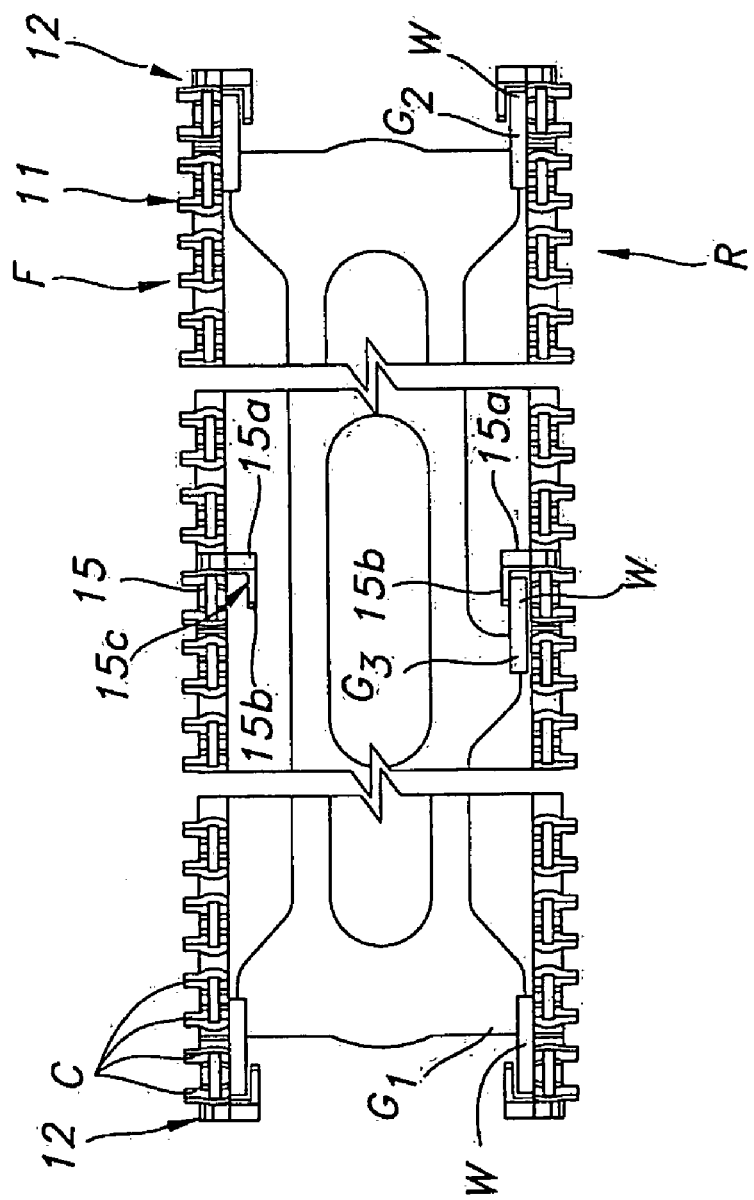
FIG. 7 is an end view of another support arrangement for a conveyor chain that includes surface projections or cleats.

Turning now to FIG. 7, one aspect of the present invention is providing one or more rows with at least one intermediate link 13 between the outermost sides of the chain 10 in the form of a guide link 15. In one embodiment, this guide link 15 includes a projection extending adjacent a surface opposite the conveying surface 11 in the form of an arm 15a (which is depending along the forward run F, but upstanding when viewed along the return run R) carrying an inwardly extending, transverse tab 15b. This arm 15a and tab 15b together define a recess 15c sized and otherwise adapted for receiving a part of a longitudinally extending guide rail $G_3$ positioned intermediate of the spaced apart side guide rails $G_1$, $G_2$ (frame members) along the return run R (and preferably slightly downstream of the transition and spaced transversely of any sprockets K associated therewith). Preferably, each intermediate guide link 15 with the arm 15a/tab 15b combination is of one-piece construction, although as noted in the description that follows, a two-piece arrangement may also be used.

The intermediate guide rail $G_3$ forming part of the system S is preferably supported by one or both of the side guide rails $G_1$, $G_2$ of the frame E. Like the side guide rails $G_1$, $G_2$, this intermediate rail $G_3$ comprises a relatively thin, elongated wear strip W preferably made of a tribologically enhanced, lubricous, or otherwise matched material. This wear strip W is preferably supported so as to form a projecting tongue along one side adapted for receipt in the recess 15c (collectively, a groove) of the longitudinally spaced intermediate guide links 15 with the depending arms 15a and transverse tabs 15b. The guide rail $G_3$ may also be similar in construction to the corresponding portion of either side guide rail $G_1$, $G_2$ shown in the drawing figures, or may instead be C-shaped or L-shaped in cross-section.

As a result of this arrangement, full and direct support for the suspended portion (e.g., row) of the chain 10 intermediate of the side links 12 along the return run R results without any wear on the conveying surface. As mentioned above, this arrangement is preferable in situations where the chain 10 is particularly wide (e.g., twenty-five inches or more, but the actual dimension will depend on the type of materials used in the parts forming the chain and their relative dimensions). However, this aspect of the disclosed invention, and providing support in a suspended fashion, may also be useful in situations with a chain 10 of a lesser width but nonetheless susceptible to sagging (for example, when the connectors 14 are relatively small or flimsy, made of polymers and subject to creep, or the associated links are made of a dense material (e.g., steel)).

As shown in FIG. 7, the intermediate guide link 15 including the depending arm 15a may be of a similar construction to the side guide link 12. In particular, the arm 15a may extend from one side of the body of the link 15. Indeed, it is possible to use a side link 12 as the intermediate guide link 15 with the depending arm 15a. However, it would normally be unnecessary to also use a locking tab in the arm 15a of such an intermediate link 15, since the connector 14 is securely retained by the existing side links 12. Note that in FIG. 7, the links 12, 13, 15 are shown as including upstanding projections, or cleats C, along the conveying surface, which is entirely optional. However, it should be understood that an advantage of the present invention is to support any chain 10 regardless of whether it includes projections from the conveying surface 11. An intermediate guide link 15 may also be provided in each row of links, or alternatively in selected rows only (e.g., every other row, every fifth row, every tenth row, etc.) depending on the desired level of support required.

Instead of using a "regular" side link 12 of the type disclosed as the intermediate guide link 15, it is entirely possible to use a link having an arm projecting from anywhere along the underside surface (i.e., the surface opposite the conveying surface 11) of the link body. Thus, in the example shown in FIG. 8b, the arm 15a extends from the underside of the body of the intermediate guide link 15 near the middle or center, as opposed to adjacent one vertical side face or the other. The associated tab 15b when the arm 15a is upstanding may nevertheless engage the corresponding intermediate guide rail $G_3$ (not shown in FIG. 8b) along the return run R to provide the desired support.

Figure 9A:
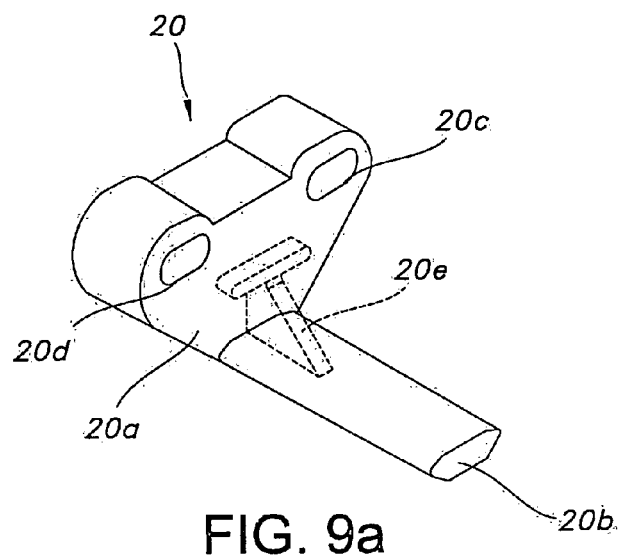
FIGS. 9a-9c are perspective, side, and end views of an intermediate guide link for nesting in a recess formed in one or more links in the conveyor chain.
Figure 9B:
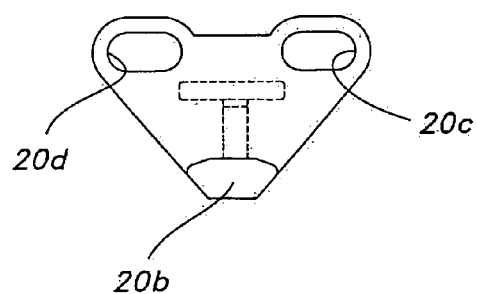
Figure 9C:
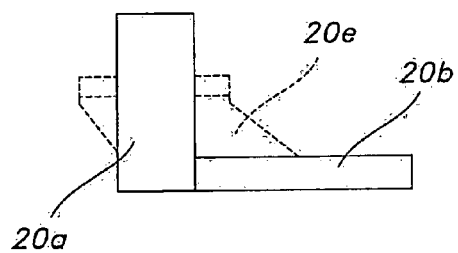

With continued reference to FIG. 8b and now referring also to FIGS. 9a-9c, another approach involves the use an intermediate guide link 20 that does not form part of the conveying surface 11 of the chain 10. In one version of this embodiment, the intermediate guide link 20 is preferably sized and shaped to fit (or nest) into a recess 22 formed in one link (see FIG. 10) or created by adjacent pairs of the links forming the conveying surface 11 (although it could simply be pressed against the underside surface of the other link instead of nesting in a recess). This intermediate guide link 20 preferably includes a body 20a, a projecting tab 20b, and a pair of spaced openings 20c, 20d. Optional reinforcement structures 20e are shown in phantom and may include platforms to engage the undersides of the corresponding link(s) into which the guide link 20 is associated.

Figure 11:
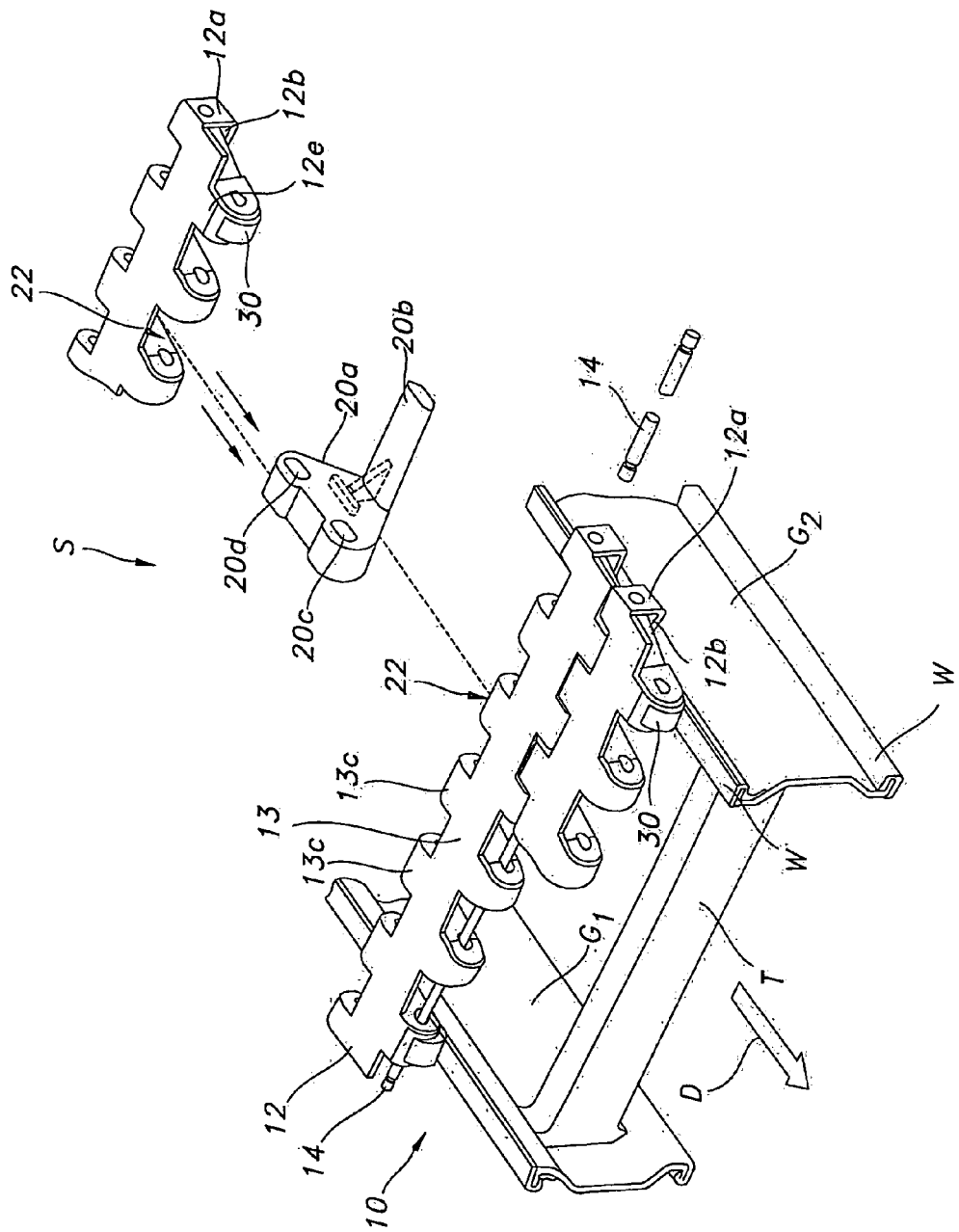
FIG. 11 is a partially cutaway perspective view of a conveyor system incorporating the intermediate guide link of FIGS. 9a-9c.
Figures 12, 12A:
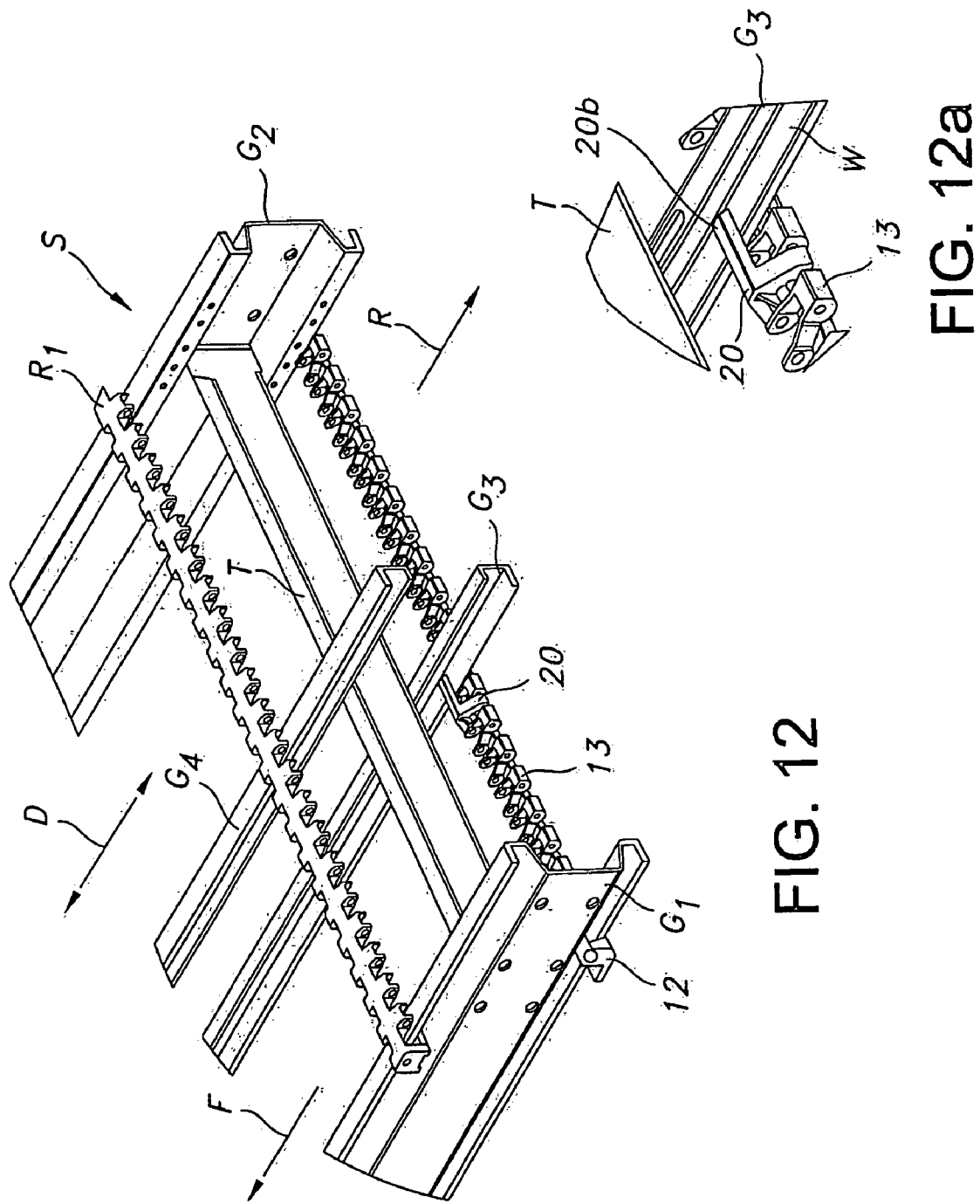
FIGS. 12 and 12a are partially cutaway perspective views of a different conveyor system incorporating an intermediate guide link similar to the one of FIGS. 9a-9c.
Figure 13:
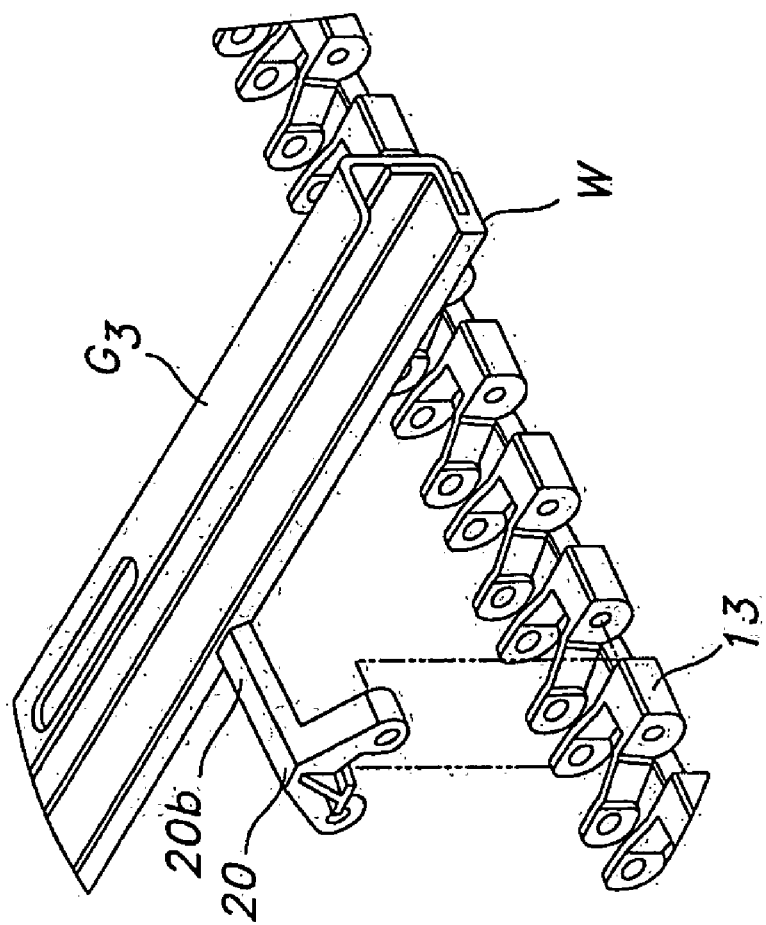
FIG. 13 is an enlarged exploded view similar to FIG. 12.
Figure 14:
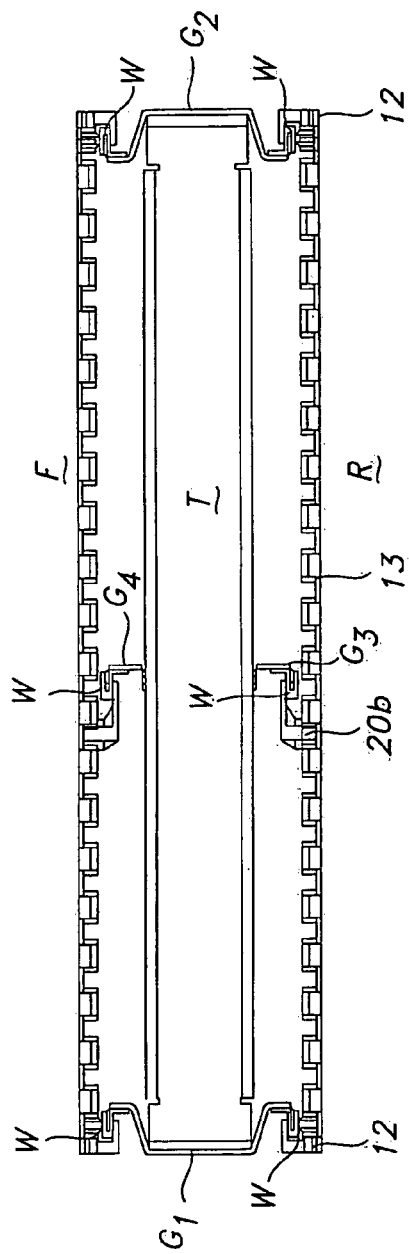
FIGS. 14 and 14a are side and enlarged cutaway views of the system of FIG. 12.
Figure 14A:
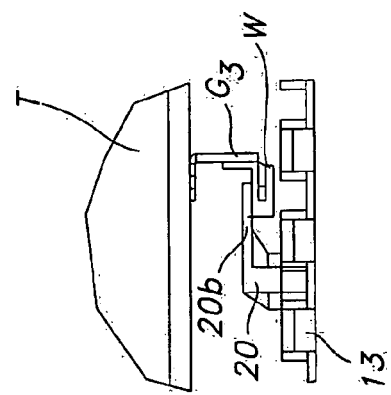

In use, and with reference to FIG. 11, the openings 20c, 20d (which may be slots as shown, or alternatively circular holes) receive the first and second transverse connectors 14 passed through the interdigitated portions of side and intermediate links 12, 13 for interconnecting the adjacent rows of links forming the conveyor chain 10. When this intermediate guide link 20 is retained in place in the recess 22 defined by the interdigitated links (such as in the rearwardly projecting portion of a leading link and the gap between the forwardly projecting portions of the next-adjacent trailing link) or otherwise, the body 20a thus qualifies as a projecting portion or arm (depending along the forward run F, upstanding along the return run R). The tab 20b may thus engage the intermediate guide rail $G_3$ (see FIG. 7) positioned opposite the conveying surface 11 along the return run R to provide the desired support and prevent sagging. Rollers 30 may also be included in the links, as shown and described in U.S. Pat. Nos. 6,585, 110 and 6,364,095, the disclosures of which are incorporated herein by reference, and a transverse beam T may also connect the outer side guide rails $G_1$, $G_2$.

FIGS. 12, 12a, 13, 14, and 14a show a related embodiment of a system S in which an intermediate guide link 20 is recessed in another link 13 of a row $R_1$ of interconnected links 12, 13 in the chain 10. In this embodiment, it is noted that the intermediate guide rail $G_3$ is C-shaped in cross section and is illustrated as extending in the conveying direction D (double-headed action arrow in FIG. 12). Another intermediate guide rail $G_4$ is also provided along the forward run F for engaging the projection 20a from the intermediate guide link 20. Both intermediate guide rails $G_3$, $G_4$ may be bolted to the transverse member T supported by the guide rails $G_1$, $G_2$ serving as frame members E.

In accordance with another aspect of the invention, a support arrangement for a modular conveyor chain 10 having a return run R is disclosed. At least one intermediate guide link 15 (or 20) in the chain 10 includes an upstanding projection 15a carrying a tab 15b projecting in a transverse direction P relative to the conveying direction D. A longitudinally extending rail $G_3$ positioned along the return run opposite the conveying surface engages the tab 15b of the intermediate link 15. As a result of this arrangement, the rail $G_3$ directly supports chain 10 along the return run R to prevent sagging.

Figure 6:
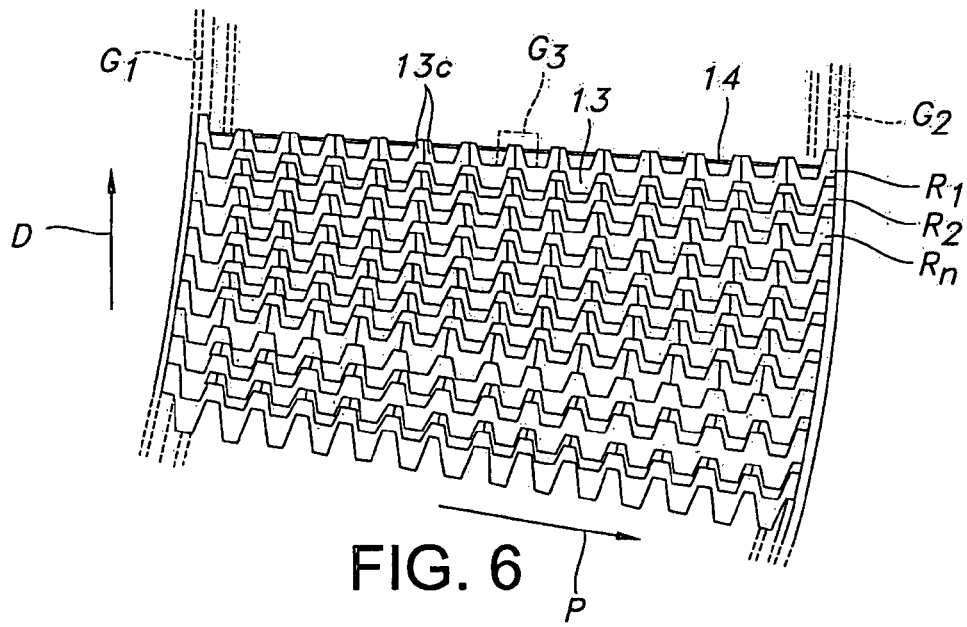
FIG. 6 is a top view illustrating the side-flexing nature of the chain and its concomitant ability to negotiate curves in the conveyor system.

Besides the intermediate link 15, the corresponding row forming part of the chain 10 may comprise side guide links 12 also characterized by the inclusion of a depending arm 12a and transverse tab 12b for engaging corresponding guide rails $G_1$, $G_2$ along the outer sides of the return run R. The side guide links 12 and intermediate link 13 may be of one-piece construction (as shown in FIG. 11), or instead may be of multi-piece construction (as shown in FIG. 6).

Yet another aspect of the disclosed invention is a method of manufacturing a support arrangement for a modular conveyor chain 10 having a return run R along which at least one intermediate link 15 (or 20) includes an upstanding projection 15a carrying a tab 15b projecting in a direction P transverse to the conveying direction D is described. The method comprises positioning a longitudinally extending rail $G_3$ along the return run R opposite the conveying surface 11 for engaging the tab 15b of the intermediate link 15 and directly supporting the chain 10 to prevent sagging. The method may also comprise providing at least three links in the row (including the intermediate link 15) with the upstanding projection (such as side links 12 with projection 12a) and tab (e.g., tab 12b) for engaging a corresponding a longitudinally extending rail $G_1$, $G_2$, $G_3$ along the return run R.

Still another aspect of the invention is a method of manufacturing a conveyor system. The method comprises forming an endless conveyor chain 10 of a plurality of modular links, including by passing a transverse connector 14 through at least one intermediate guide link 15 (or 20) having a projection 15a carrying a tab 15b extending in a direction P transverse to the conveying direction D. The method further comprises supporting the endless chain 10 to create a forward run F and a return run R including a longitudinally extending rail opposite a conveying surface 11 of the chain 10 for engaging the tab 15b.

The method may further comprise supporting the chain by positioning a longitudinally extending guide rail $G_1$, $G_2$ to engage spaced side links 12 of the conveyor chain 10 at least along the return run R, as well as retaining the transverse connector 14 in place using a locking tab 17 inserted in the side guide links 12. Additionally, the method may include the step of nesting the intermediate link 20 in a recess 22 of another link 13 before the passing step, and then passing a second transverse connector through the side and intermediate links 12, 20.

A further aspect of the invention comprises a method of conveying articles. The method comprises providing a modular conveyor chain 10 having a return run R along which at least three links (such as side links 12 and intermediate link 15 or 20) include an upstanding projection 12a, 15a carrying a tab 12b, 15b projecting in a transverse direction P. The method further includes driving the chain 10 along an endless path (such as by using sprockets K gang-driven by a motor M), including along a longitudinally extending rail $G_1$, $G_2$, $G_3$ along the return run R opposite the conveying surface 11 for engaging each corresponding tab and directly supporting the chain 10 to prevent sagging.

The foregoing description of various embodiments of the present invention have been presented for purposes of illustration and description. The description is not intended to be exhaustive or to limit the invention to the precise forms disclosed. Obvious modifications or variations are possible in light of the above teachings. For example, more than one intermediate guide link 15, 20 may be provided in a single row, along with a corresponding number of guide rails along the return run R, as long as none present interfere with any drive or idler sprockets present. Likewise, two or more of the links 12, 13, 15 in the row may be fused to form a one-piece body. Each intermediate guide rail $G_3$ along the return run R may also be tapered or curved adjacent the transition. This helps to ensure smooth, uninterrupted engagement with the tab 15b, 20b of any intermediate guide links 15, 20 results as the chain transitions from the forward run F to the return run R, or vice versa. A single guide rail $G_1$, $G_2$, $G_3$ could also engage two of the transverse tabs projecting towards each other. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention.

The invention claimed is:

1. A conveyor system for intended use in moving one or more articles in at least a conveying direction along an endless path having a forward and a return run, comprising:
 a plurality of modular links forming a row extending transverse to the conveying direction, said row including at least three projections extending opposite a conveying surface, each projection carrying a transversely extending tab; and
 rails extending in the conveying direction along the return run, for engaging the tabs and providing enhanced support for the row to prevent sagging and reduce wear on the conveying surface.

2. The system according to claim 1, wherein each rail is carried by at least one transverse member supported by a side frame member of the conveyor system.

3. The system according to claim 1, wherein at least one of the links comprises a side guide link.

4. The system according to claim 3, wherein the side guide link is of one-piece construction.

5. The system according to claim 3, wherein the side guide link includes one of the projections.

6. The system according to claim 1, wherein one of the projections is associated with a body sized for positioning within a recess of one of said links.

7. The system according to claim 6, wherein the body includes at least one opening for receiving a transverse connector associated with and interconnecting the row of links.

8. A conveyor system for intended use in moving one or more articles in at least a conveying direction along an endless path having a forward and a return run, comprising:
 a plurality of modular links forming a row extending transverse to the conveying direction, said row including at least three projections extending opposite a conveying surface, each projection carrying a transversely extending tab; and
 at least three rails extending in the conveying direction along the return run, each for engaging one of the tabs and providing enhanced support for the row to prevent sagging and reduce wear on the conveying surface.

9. The system according to claim 8, wherein each rail is carried by at least one transverse member supported by a frame member of the conveyor system.

10. The system according to claim 8, wherein at least one of the links comprises a side guide link.

11. The system according to claim 10, wherein the side guide link is of one-piece construction.

12. The system according to claim 10, wherein the side guide link includes one of the projections.

13. The system according to claim 8, wherein one of the projections is associated with a body sized for positioning within a recess of one of said links.

14. The system according to claim 13, wherein the body includes at least one opening for receiving a transverse connector associated with and interconnecting the row of links.

15. A conveyor system for intended use in moving one or more articles in at least a conveying direction along an endless path having a forward and a return run, comprising:
 a plurality of modular links forming a row extending in a direction transverse to the conveying direction, said row including at least three projections extending opposite a conveying surface, each projection carrying a transversely extending tab; and
 at least three rails extending in the conveying direction along the return run and spaced apart in the transverse direction, each of said rails for engaging one of the tabs and providing enhanced support for the row to prevent sagging and reduce wear on the conveying surface.

16. The system according to claim 15, wherein each rail is carried by at least one transverse member supported by a frame member of the conveyor system.

17. The system according to claim 15, wherein at least one of the links comprises a side guide link.

18. The system according to claim 17, wherein the side guide link is of one-piece construction.

19. The system according to claim 15, wherein one of the projections is associated with a body sized for positioning within a recess of one of said links.

20. The system according to claim 19, wherein the body includes at least one opening for receiving a transverse connector associated with and interconnecting the row of links.

* * * * *